United States Patent

Matinez

Patent Number: 5,412,901
Date of Patent: May 9, 1995

[54] FLEXIBLE BODY FISHING LURE

[76] Inventor: Gilbert S. Matinez, 4224 Birchall, Toledo, Ohio 43612

[21] Appl. No.: 946,556

[22] Filed: Sep. 17, 1992

[51] Int. Cl.⁶ .............................................. A01K 85/00
[52] U.S. Cl. .................. 43/42.22; 43/42.19; 43/42.36
[58] Field of Search ................. 43/42.36, 42.13, 42.22, 43/42.19, 44.9

[56] References Cited

U.S. PATENT DOCUMENTS

| | | | |
|---|---|---|---|
| 2,633,659 | 4/1953 | Baum | 43/42.22 |
| 3,023,534 | 3/1962 | Smith | 43/42.22 |
| 3,090,152 | 5/1963 | Helin | 43/42.47 |
| 3,238,660 | 3/1966 | Pcola | 43/43.13 |
| 4,602,452 | 7/1986 | Reid | 43/42.36 |
| 4,700,503 | 10/1987 | Pippert | 43/42.09 |
| 4,914,849 | 4/1990 | Hook | 43/42.36 |
| 5,038,512 | 8/1991 | Gaal | 43/42.19 |
| 5,077,930 | 1/1992 | Berry | 43/42.22 |

Primary Examiner—P. Austin Bradley
Assistant Examiner—Jeanne M. Elpel
Attorney, Agent, or Firm—Donald R. Fraser

[57] ABSTRACT

A fishing lure having an elongate deformable body whereby the depth of the lure and the path traveled by the lure in a body of water, when the lure is pulled through the water, may be adjusted by changing the shape of the deformable lead body. The deformable body has a nonuniform shape which results in the lure being oriented in the water such that the flat top faces the surface of the water. When the fishing lure is pulled through the water, the fishing lure will be at a specific depth depending on the weight of the lure and the speed at which the lure is pulled through the water. When the deformable body of the same lure is bent to form a concave top surface, the change in the hydrodynamics of the lure body causes the lure, when pulled at the same speed, to be positioned closer to the surface of the water. Conversely, when the deformable body of the same lure is bent to form a convex top surface, the change in hydrodynamics causes the lure to be positioned deeper in the water. Twisting the lure body will cause the lure body to alter its path and produce a spiral or wobble action. A stainless steel shank extends through the deformable body to facilitate the mounting of one or more spinners and colored beads on the lure. A loop with a coil spring closure mechanism is formed at the end of the shank to connect a hook to the lure.

4 Claims, 1 Drawing Sheet

FLEXIBLE BODY FISHING LURE

BACKGROUND OF THE INVENTION

1. Field of the Invention

The invention relates to fishing lures, and more particularly, to a weight-forward fishing lure having a deformable body which may be adjusted in shape to vary the path the lure travels through the water.

2. Summary of Related Art

In the sport of fishing, the bait is generally either in the form of an artificial lure fabricated in various forms and shapes such as plugs, jigs, spinners, flies, and the like, or in some form of edible substance, such as worms and fish bait, including minnows and larger fish species.

In recent years, one of the most popular types of lures has been the plastic lures which may be utilized as trailers on host lures such as spinner bait lures, or with lead jig heads of various size and shape having a hook embedded therein. The plastic lures are constructed by injection molding techniques and are designed to simulate worms and other swimming creatures.

The plastic lures are used in cooperation with a lead sinker which is placed on the fishing line immediately above the hook with the hook projected through the fishing lure in one of many possible configurations. The lead sinker causes the lure and hook to sink to the bottom of a lake and the lure is retrieved using a variety of rod actions, depending on the type of fish sought, the water depth, and the weather conditions.

Plastic lures are disclosed in U.S. Pat. No. 4,367,607 to Hedman and U.S. Pat. No. 4,790,100 to Green, Sr.

Many types of fishing jigs are known in the prior art, and a number of these jigs have a relatively heavy or dense body portion which acts as a stabilizing weight. The body portion includes an anchor point for the eye to which the retrieving line is secured. A second eye secured to the body portion functions as a swivel situs to which a hook is swivelly connected. In order to disguise the hook and/or attract fish to the lure, some jigs of this type also have buck tails or skirts attached to the lure body.

U.S. Pat. Nos. 4,751,789 and 4,920,688 to Devereaux et al, for example, disclose a fishing lure which includes a heavy lure body having a nonuniform shape. When the lure is rested during retrieval, the body portion of the lure will rest nose down on the bottom of the lake.

The path and depth at which a lure is drawn through the water is an important factor when fishing. Depending on the time of day, the weather conditions, the temperature of the water, and other factors, the desired species of fish will be found at different depths in the lake. Fishermen have a variety of procedures for changing the path and depth at which they are fishing, including the design and weight of the lure. Fishermen will change lures to get the desired depth and action for attracting and catching fish.

The weight and shape of the lure determine whether a lure is a surface lure, an intermediate depth lure, or a bottom lure for fishing the bottom of a lake. When the fish are not biting, the fishermen will use a variety of lures and fishing techniques in order to catch fish. Once a lure is attached to a fishing line, it is often inconvenient and time consuming to change a lure.

In order to attract fish to the lure, a number of different features are often incorporated into the design of a lure. The color, motion, and odor of the lure are generally considered important in attracting fish. The lures often simulate the movement of fish or other forms of live bait when the lures are pulled through the water. Depending on the water conditions, weather conditions, and time of day, different colors of lures are often more or less successful than other colors. Lures may be specially designed to facilitate the use of live bait in conjunction with the lure.

SUMMARY OF THE INVENTION

In accordance with the present invention, there is provided a fishing lure provided with a deformable lure body whereby the path and action of the lure when the lure is pulled through the water, may be changed by altering the shape of the deformable lure body. The deformable body is provided with a generally flat top and a curved bottom having an arcuate surface formed from one longitudinal edge of the top to the other longitudinal edge. The forward end of the flexible body is smaller and lighter than the rear end of the flexible body.

Because the curved bottom at the rear end of the flexible lead body is the heaviest portion of the flexible body, the body is generally positioned in the water with the flat top facing the surface of the water and the curved bottom facing the bottom of the lake.

When the fishing lure is pulled through the water, such as when casting, trolling, or drifting, the fishing lure will follow a certain path at a certain depth depending on the shape and weight of the lure and the speed at which the lure is pulled through the water. When the deformable body of the same lure is bent to form a concave top surface, the change in the hydrodynamics of the lure body causes the lure to travel a path closer to the surface of the water when pulled at the same speed. Conversely, when the deformable body of the same lure is bent to form a convex top surface, the change in hydrodynamics causes the lure to travel a path deeper in the water. Twisting the deformable body causes the lure to wobble or travel in a spiral motion. By combining the bending and twisting of the deformable lure body, the path and or depth of the lure can be changed considerably.

In its simplest form, the lure of the present invention consists of a lure body having a means for connecting a retrieval line at one end and a means for connecting a hook at the other end. In the preferred embodiment shown in the FIG. 1, a stainless steel shank extends through the deformable body. The shank may be positioned slightly off-center to produce a wobble action as the lure is being retrieved. An eye is formed at the forward end of the deformable body for attachment of the retrieval line. At the rear end of the body, the shank is extended to facilitate the mounting of one or more spinners and colored beads on the lure. A loop with a coil spring closure mechanism is formed at the end of the shank to connect a hook to the lure.

The deformable body is generally painted with multiple layers of a flexible and corrosion resistant paint, such as an acrylic or epoxy based paint. The spinners and beads are color coordinated with the body of the lure.

An object of the present invention is to provide a new and improved fishing lure with a deformable body that may be altered after the lure is tied to a line. By manually changing the shape of the deformable body of the lure, the path and action of the lure can easily be adjusted to improve the performance to the lure in attracting and catching fish.

An additional object of the present invention is to provide a rugged and cost competitive fishing lure that is effective for catching fish. Because the deformable lure body may be changed in shape to provide a variety of paths and actions for the same lure, a fisherman may be able to save money by reducing the number of lures needed to properly stock a tackle box.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
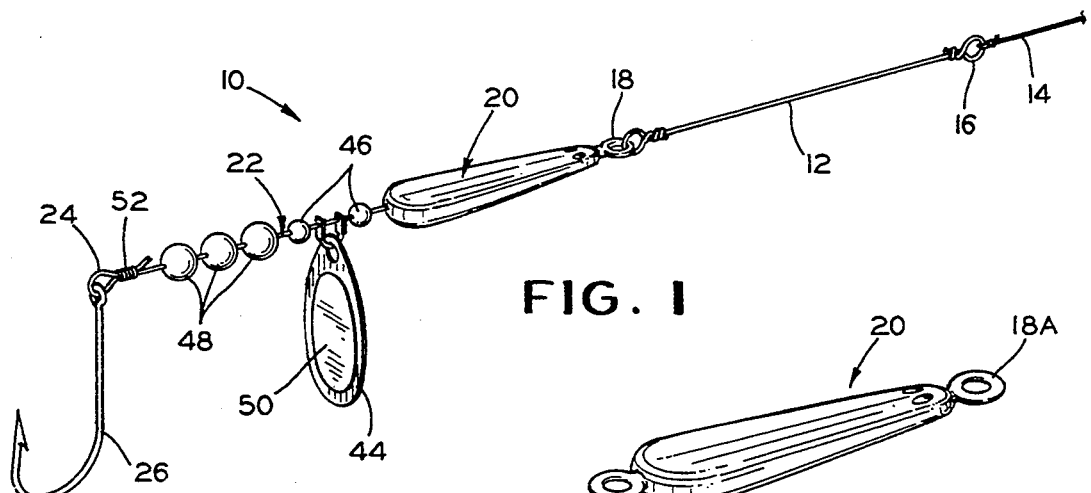
FIG. 1 is a perspective view of the flexible body fishing lure of the present invention.

Referring now to the drawings, there is shown in FIG. 1 the deformable body fishing lure 10 of the present invention. A stainless steel leader 12 is generally furnished as part of the lure 10. The fishing line 14 may be attached to the eye 16 of the leader 12 or directly to the retrieval eye 18 of the lure body 20 when a leader 12 is not furnished. The fishing lure 10 is a weight forward lure.

Figure 2:
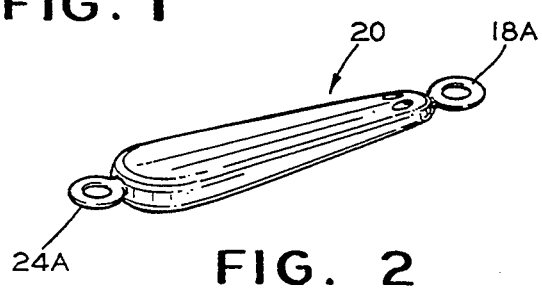
FIG. 2 is a perspective view of an alternative embodiment of the fishing lure.

The preferred embodiment shown in FIG. 1 includes a stainless steel shank 22 extending from the lure body 20. The shank is provided with an open loop 24 at one end for mounting the hook(s) 26 and other components onto the lure 10. FIG. 2 shows a simpler embodiment in which a reinforced retrieval eye 18A formed as an integral part of forward end of the lure body 20. A fastening means 24A or other means may be included with the lure body 20 for mounting a hook as an integral part of the rear end of the lure body 20.

The lure body 20 should have sufficient weight and density to cause the lure 10 to sink in a body of water. The lure body 20 is made from a pliable material which permits deformation of the lure body 20 without breaking the lure body 20. However, material for the lure body 20 should also have the desired inelastic properties to retain its shape after the lure body 20 has been bent and/or twisted into form by a fisherman.

The lure body 20 may be made from a variety of materials to achieve the proper density and inelasticity. The materials include soft metals, plastics, other elastomeric polymers, and combinations of these materials. The lure body 20 is typically made from soft lead, which also includes amounts of antimony and/or tin. The antimony and/or tin content of the lead may be adjusted to achieve the desired properties. The lead is hand poured into molds of the desired shape, instead of using a centrifugal casting process, in order to maintain the flexibility of the lead after the casting process is completed. The lure body 20 could also be made from a metal core surrounded by a deformable plastic outer shell.

Figure 3:
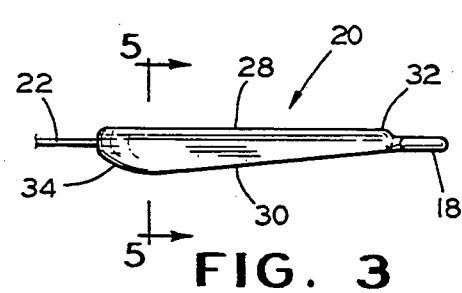
FIG. 3 is a side elevational view of the lure body shown in FIG. 1.
Figure 4:
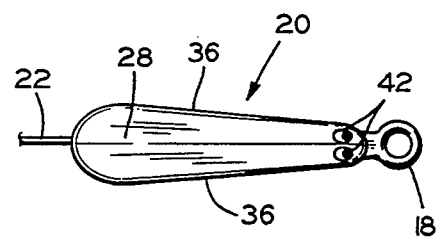
FIG. 4 is a top plan view of the lure body.
Figure 5:
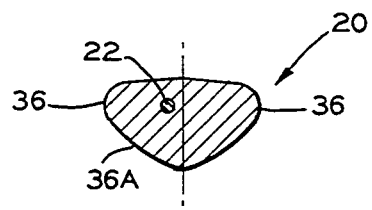
FIG. 5 is a cross-sectional view of the lure body taken along line 5—5 of FIG. 3.

The lure body 20, as shown in FIGS. 3–5, is provided with a flat top 28 and a curved bottom 30. The forward end 32 of the lure body 20 is narrower and thinner than the rear end 34 of the lure body. The wider and thicker rear end 34 provides the desired weight distribution to maintain the lure body 20 in the proper orientation as the lure 10 is pulled through the water. The lure body 20 will generally travel through the water with the flat top 28 facing the surface of the water.

Figure 5A:
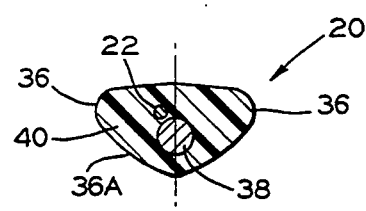
FIG. 5A is a cross-sectional view of another alternative embodiment of the lure body having a metal core and plastic body.

The flat top 28 of the lure body 20 is provided with two, non-parallel longitudinal edges 36. The curved outer surface 36A of the bottom 30 extends arcuately between the longitudinal edges 36 as shown in FIGS. 5 and 5A. The shank 22 is also seen in these figures. The shank 22 may extend through the lure body 20, forming the retrieval eye 18 at one end and the open loop 24 at the other end. FIG. 5 shows a lure body 20 made from a single material and FIG. 5A shows a similar cross section for an alternative embodiment of the lure body 20 having a metal core 38 and plastic cover shell 40.

After the lure body 20 has been formed from a soft metal such as lead, the body 20 is painted in the desired pattern and color. The open loop 24 may be used to handle and hang the lure bodies 20 during the painting process. The initial application is usually one or two clear coats followed by an undercoat. The color coat(s) are completed next and fish eyes 42 are typically added on the forward end of the body. The color coats may include a variety of colors and patterns. After the color coats are completed, a clear coat is applied to seal the paint finish. A paint with sufficient elasticity to accommodate the bending and the twisting should be used.

After the paint on the lure body 20 has dried, the spinner 44, the metal beads 46, and the plastic beads 48 are slid onto the open end 24 of the shank 22. The metal beads 46 facilitate the rotation of the spinner 44 as it travels through the water. Rotatable colored plastic beads 48 are included to help attract the fish. The color of the lure body 20 is coordinated with the color of the beads 48 and the spinner decal 50 to provide an acceptable color scheme for the lure 10.

Once all of the desired spinners 44 and beads 46 have been added to the shank 22, the hook 26 or hooks are positioned at the end of the shank 22. A coil spring is used to position the hook and close the open end 24 of the shank 22. The free end 54 of the loop 24 on shank 22 is threaded back through the coil spring 52 and bent away from the shank 22 to secure the loop 24.

A worm, minnow or other bait may be placed on the hook 26 of the lure 10 to provide further attraction to the fish. The lure 10 may also be used without any bait on the hook 26.

When the lure 10 is pulled through the water by trolling or casting, the path of the lure 10 in the water is determined primarily by the weight and shape of the lure 10 and the speed at which the lure 10 is drawn through the water. Because the heaviest segment of the lure body 20 is the rear end 34 of the curved bottom 30, the lure body 20 will typically position itself with the flat top 28 towards the surface of the water when the lure is pulled through the water when trolling or casting.

When the lure body 20 is in the flat configuration as shown in FIG. 3, the lure will one path and depth for a given weight and speed. At the same weight and speed, the lure 10 can be modified to travel a different path and/or depth by merely bending or twisting the body 20 of the lure 10.

The lure body 20 is deformable to permit a fishermen to bend and/or twist the lure body 20 by using only the fisherman's hands. However, the lure body 20 should have sufficient rigidity to maintain its shape after the lure body 20 has been bent and twisted to the desired position.

Figure 6:
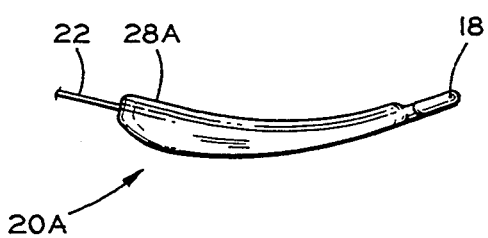
FIG. 6 is a side elevational view of the lure body after being bent to form a concave top surface.

Bending the lure body 20 such that the top surface 28 changes from a generally flat top 28 to a concave surface 28A, as shown with lure body 20A in FIG. 6, will change the hydrodynamic forces on the lure 10 as the lure is pulled through the water. The upwardly curved surface 28A reduces the hydrodynamic force on the top surface 28A. Consequently, two similar lure bodies 20 and 20A travelling through the water at the same speed, lure body 20 having a flat top surface 28 and lure body 20A having a concave top surface 28A, will be located at different depths. The lure body 20A with the concave top surface 28A will be closer to the surface of the water than the lure 10 with a flat top 28.

Figure 7:
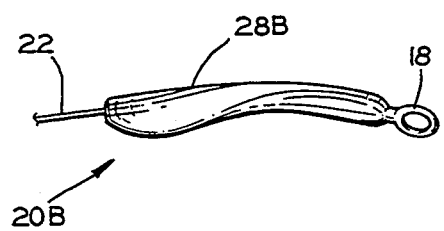
FIG. 7 is a side elevational view of the lure body after being bent to form a convex top surface and twisted to alter the path of the lure.

FIG. 7 shows a lure body 20B adjusted to form a convex top surface 28B. The hydrodynamic forces causes the lure body 20B to travel at a deeper depth than the lure body 20 illustrated in FIGS. 1–6 under similar circumstances.

The twisting of the lure body 20B will produce a wobble or spinning action of the associated lure to attract fish.

The lure body may also be caused to wobble by positioning the shank 22 in an off-center position, as shown in FIG. 5. When the lure 10 is drawn through the water, the lure body 20 will wobble to produce a desirable fish attracting swimming action.

Being able to quickly and easily change the hydrodynamics of the lure 10 to vary the path and/or depth at which the lure 10 travels provide a fisherman with significant flexibility. If the fish are not striking with the lure 10 at one depth or in one path, the fisherman simply bends or twists the lure 10 in the desired direction to change the depth or path at which the lure travels through the water. When trolling or drift trolling for sport fish on a large lake, this capability helps the fisherman in getting his lure 10 to the desired depth with the desired action.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A fishing lure comprising:
   a) an elongate deformable body having a forward end, a rear end, and a longitudinal center axis, said deformable body including a generally flat top, and a curved bottom extending arcuately from a first longitudinal edge of the top to a second longitudinal edge of the top;
   b) a shank extending longitudinally through said deformable body, said shank offset from and extending generally parallel to the longitudinal center axis of said deformable body and provided with a retrieval means formed in said shank at the forward end of said deformable body for attaching a retrieval line, an exposed shank segment extending longitudinally from the rear end of said deformable body, and a loop formed in a free end of the exposed shank segment of said shank, said deformable body and said shank being formed to allow bending of the deformable body along the longitudinal center axis, whereby the depth and path of the lure in the water may be changed by bending the deformable body and whereby the lure is pulled through a body of water by the retrieval line;
   c) blade means rotatably mounted on the exposed segment of said shank, whereby said blade means may be caused to spin when the lure is pulled through the water by the retrieval line; and
   d) a hook pivotally connected to the loop formed in the free end of said shank.

2. The fishing lure defined in claim 1 wherein said deformable body is wider and thicker at the rear end than at the forward end whereby the flat top faces up when the fishing lure is pulled through the body of water.

3. A fishing lure comprising:
   a) an elongate deformable body having a forward end, a rear end, and a longitudinal center axis, said deformable body provided with a generally flat top, and a curved bottom extending arcuately from a first longitudinal edge of the top to a second longitudinal edge of the top, said deformable body being wider and thicker at the rear end than at the front end of said deformable body;
   b) a shank extending longitudinally through said deformable body, said shank offset from and extending generally parallel to the longitudinal center axis of said deformable body and provided with a retrieval means formed at the forward end of said deformable body for attaching a retrieval line, an exposed shank segment extending longitudinally from the rear end of said deformable body, and a loop formed in a free end of the exposed shank segment of said shank, said deformable body and said shank being formed to allow bending of the deformable body along the longitudinal center axis, whereby the depth and path of the lure in the water may be changed by bending the deformable body and whereby the lure may be caused to wobble in a fish-like manner when the lure is pulled through the water by the retrieval line;
   c) spinner blade rotatably mounted on the exposed segment of said shank, whereby said spinner blade may be caused to spin when the lure is pulled through the water by the retrieval line; and
   d) a hook pivotally connected to the loop formed in the free end of said shank.

4. The fishing lure defined in claim 3 including a pair of beads, a first bead mounted on the exposed shank segment between said deformable body and an end of said spinner blade means rotatably connected to the exposed shank segment, and a second bead mounted on the exposed shank segment between the connected end of said spinner blade and the loop at the end of the exposed shank segment, whereby a bearing surface is formed on both sides of said spinner blade.

* * * * *

UNITED STATES PATENT AND TRADEMARK OFFICE
CERTIFICATE OF CORRECTION

PATENT NO. : 5,412,901
DATED : May 9, 1995
INVENTOR(S) : Gilbert S. Martinez It is certified that error appears in the above-identified patent and that said Letters Patent is hereby corrected as shown below:

On the title page, the inventor's name "Matinez" should be spelled --Martinez--.

Signed and Sealed this

Twenty-ninth Day of October 1996

Attest:

BRUCE LEHMAN

*Attesting Officer*  *Commissioner of Patents and Trademarks*